US012578294B2

(12) United States Patent
Park

(10) Patent No.: US 12,578,294 B2
(45) Date of Patent: Mar. 17, 2026

(54) MXENE-LIGNIN COMPOSITE AND POWER-FREE CHEMICAL SENSOR INCLUDING THE SAME AS AN ACTIVE LAYER

(71) Applicant: INDUSTRY-ACADEMIC COOPERATION FOUNDATION GYEONGSANG NATIONAL UNIVERSITY, Jinju-si (KR)

(72) Inventor: Jun Hong Park, Jinju-si (KR)

(73) Assignee: INDUSTRY-ACADEMIC COOPERATION FOUNDATION GYEONGSANG NATIONAL UNIVERSITY, Jinju-si (KR)

( * ) Notice: Subject to any disclaimer, the term of this patent is extended or adjusted under 35 U.S.C. 154(b) by 0 days.

(21) Appl. No.: 19/023,978

(22) Filed: Jan. 16, 2025

(65) Prior Publication Data

US 2025/0271383 A1      Aug. 28, 2025

(30) Foreign Application Priority Data

Feb. 22, 2024      (KR) ........................ 10-2024-0025864

(51) Int. Cl.
 *G01N 27/12*          (2006.01)
(52) U.S. Cl.
 CPC .................................. *G01N 27/126* (2013.01)
(58) Field of Classification Search
 CPC ..................................................... G01N 27/126
 See application file for complete search history.

(56) References Cited

FOREIGN PATENT DOCUMENTS

| | | | | |
|---|---|---|---|---|
| CN | 115041027 A | * | 9/2022 | |
| CN | 115096953 A | | 9/2022 | |
| JP | 2564030 B2 | | 12/1996 | |
| KR | 1020180062080 A | | 6/2018 | |

OTHER PUBLICATIONS

Vaishakh Kedambaimoole, MXene wearables: properties, fabrication strategies, sensing mechanism and applications, Mater. Adv., 2022, 3, 3784-3808 (Year: 2022).*
Vaishakh et al. "MXene wearables: properties, fabrication strategies, sensing mechanism and applications," Mater. Adv., 2022, 3, 3784-3808 (Year: 2022).*

(Continued)

*Primary Examiner* — Maris R Kessel
*Assistant Examiner* — Valerie Simmons
(74) *Attorney, Agent, or Firm* — Bridgeway IP Law Group, PLLC; Jihun Kim

(57)          ABSTRACT

A MXene-lignin composite and a power-free chemical sensor including the same as an active layer according to a preferred embodiment include a MXene sheet represented by $M_{n+1}X_nT_x$ (n=1, 2, or 3) and lignin forming a chemical bond to the MXene sheet as an active layer, thereby enabling the detection of a current change amount at the nanoampere (nA) level without a power supply and easily implementing a chemical sensor with high chemical sensitivity exhibiting a fast response rate and recovery rate.

6 Claims, 17 Drawing Sheets

(56)        References Cited

OTHER PUBLICATIONS

Cho et al. "An Extremely Inexpensive, Simple, and Flexible Carbon Fiber Electrode for Tunable Elastomeric Piezo-Resistive Sensors and Devices Realized by LSTM RNN," ACS Appl. Mater. Interfaces 2019, 11, 11910-11919 (Year: 2019).*

Zhang et al. "Enzymatic hydrolysis lignin functionalized Ti3C2Tx nanosheets for effective removal of MB and Cu2+ ions," International Journal of Biological Macromolecules 209 (2022) 680-691 (Year: 2022).*

Zhang et al. "Superior Anticorrosion Performance of Well-Dispersed MXene-Polymer Composite Coatings Enabled by Covalent Modification and Ambient Electron-Beam Curing," ACS Appl. Mater. Interfaces 2023, 15, 11099-11110 (Year: 2023).*

Ji et al. "Covalent stabilization and functionalization of MXene via silylation reactions with improved surface properties," FlatChem 17 (2019) 100128 (Year: 2019).*

Wang et al. "Lignin modified Ti3C2Tx assisted construction of functionalized interface for separation of oil/water mixture and dye wastewater," Colloids and Surfaces A: Physicochemical and Engineering Aspects 656 (2023) 130371 (Year: 2023).*

Zhang, Kai-Ning et al., "Enzymatic hydrolysis lignin functionalized Ti3C2Tx nanosheets for effective removal of MB and Cu2+ ions", International Journal of Biological Macromolecules, Elsevier BV, vol. 209, Apr. 9, 2022, XP087049954, ISSN: 0141-8130, DOI: 10. 1016/J.IJBIOMAC.2022.04.036, Netherlands.

Wang, Qing-Ming et al., "Lignin modified 1-4 Ti3C2Tx assisted construction of functionalized interface for separation of oil/water mixture and dye wastewater", Colloids and Surfaces A : Physiochemical and Engineerings Aspects, [Online] vol. 656, Apr. 9, 2022, p. 130371, XP093279574, Amsterdam, ISSN: 0927-7757, DOI: 10.1016/ j.colsurfa.2022.130371, Netherlands.

Changzhou, Chen et al., "Humidity sensor 5-10 based on reduced graphene oxide/lignosulfonate composite thin-film", Sensors and Actuators B: Chemical, vol. 255, Aug. 26, 2017, pp. 1569-1576, XP055553567, ISSN: 0925-4005, DOI: 10.1016/j.snb.2017.08.168, Netherlands.

Liu, Fang et al., "Well-aligned 5-10 MXene/chitosan films with humidity response for high-performance electromagnetic interference shielding", Carbohydrate Polymers, Applied Science Publishers , Ltd Barking, vol. 243, May 25, 2020, XP086175002, ISSN: 0144-8617, DOI: 10.1016/J.CARBPOL.2020.116467, England.

Devara, I Ketut Gary et al., "Enhanced Sensitivity of Zero-Bias-Operated MXene Chemiresistive Sensor via Lignin Hybridization," ECO MAT., Apr. 25, 2024, vol. 6, No. 6, DOI: 10.1002/eom2. 12453, Wiley-VCH GmbH, Germany.

Lei, Yongjiu et al., "Laser-Scribed Graphene Electrodes Derived from Lignin for Biochemical Sensing," ACS Applied Nano Materials, 2020, vol. 3, pp. 1166-1174, American Chemical Society, DOI: 10.1021/sanm.9b01795, USA.

Kratz, Dorothee, "European Search Report for EP Application No. 25151575.5-1001", Jun. 10, 2025, EPO, Germany.

* cited by examiner

MXENE-LIGNIN COMPOSITE AND POWER-FREE CHEMICAL SENSOR INCLUDING THE SAME AS AN ACTIVE LAYER

CROSS-REFERENCE TO RELATED APPLICATION

The present application claims priority to Korean Patent Application No. 10-2024-0025864, filed Feb. 22, 2024, in the Korean Intellectual Property Office, the entire contents of which is incorporated herein for all purposes by this reference.

BACKGROUND OF THE INVENTION

Field of the Invention

The present invention relates to a MXene-lignin composite and a power-free chemical sensor including the same as an active layer.

Description of the Related Art

As concerns about air pollution increase due to increasing urbanization, the need for effective management and monitoring of hazardous gases is increasing. These environmental monitoring devices have high accuracy, sensitivity, and customization capabilities for specific applications, and solid gas sensors such as chemiresistive sensors have already been used for atmospheric monitoring and medical diagnosis because they exhibit high sensitivity even to low concentrations of analytes through changes in resistance or current when exposed to an analyte gas. However, chemiresistive gas sensors still have the problem of poor sensitivity to ultra-low concentrations of analytes, such as environmental gases, for example, $CO_2$ and $NO_2$.

In addition, based on the next-generation smart sensor technology that combines internet of things (IoT) technology and sensor technology, smart sensors for the applications in energy, industrial safety, healthcare, and biomedical fields, namely, multifunctional ultra-sensitive chemical sensor material technologies, are drawing attention.

The chemical sensitivity of sensors may be improved by reducing the thickness of an active layer, and there is increasing interest in two-dimensional (2D) materials capable of providing an electron confinement effect even with a thin thickness, thereby generating a large electrical response even to low-concentration analytes and increasing chemical sensitivity.

Among the 2D materials, MXene, which can be used as an active layer of chemical sensors, has a high specific surface area and is capable of accommodating various terminal functional groups, but has a problem of low receptivity to chemical stimuli, so various studies such as complexation and hybridization are being conducted to optimize the performance of chemical sensors.

Lignin is a biomass-derived bioenergy raw material with excellent properties such as superhydrophobicity, non-toxicity, biodegradability, ease of production, mechanical stability and chemical durability, and eco-friendliness, and thus can be used in various applications by complexing with various functional materials.

SUMMARY OF THE INVENTION

The present invention was conceived to solve the above-described problem and provides a MXene-lignin composite and a power-free chemical sensor including the composite as an active layer according to a preferred example of the present invention.

The technical problems of the present invention are not limited to the above-mentioned technical problems, and other technical problems that are not mentioned will be clearly understood by those skilled in the art from the description below.

To solve the above-mentioned technical problems, a MXene-lignin composite according to one embodiment of the present invention includes: a MXene sheet represented by $M_{n+1}X_nT_x$ (n=1, 2, or 3); and lignin forming a chemical bond to the MXene sheet. Here, M is Ti, Zr, Hf, V, Nb, Ta, Cr, Mo, W, or two or more transition metals thereof, X is C, N, or a combination thereof, $T_x$ is F, OH, or O.

The chemical bond may include a chemical bond between a transition metal (M) of the MXene sheet and a functional group included in the lignin.

Specifically, the chemical bond may include a chemical bond represented as M-OH as a bond between a transition metal (M) of the MXene sheet and a hydroxyl group (—OH) included in the lignin.

More specifically, the chemical bond may include a chemical bond represented as Ti—OH as a bond between Ti as a transition metal (M) of the MXene sheet and a hydroxyl group (—OH) included in the lignin.

To solve the above-mentioned technical problems, a power-free chemical sensor including a MXene-lignin composite according to another embodiment of the present invention includes: a substrate; a MXene-lignin composite film provided on the substrate and including an MXene sheet represented by $M_{n+1}X_nT_x$ (n=1, 2, or 3) and lignin forming a chemical bond to the MXene sheet; and at least one metal electrode formed on at least a part of the MXene-lignin composite film.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 17 shows Chemical Formula 1 representing a lignin according to one embodiment of the present invention.

DETAILED DESCRIPTION OF THE EMBODIMENTS

Figure 1:
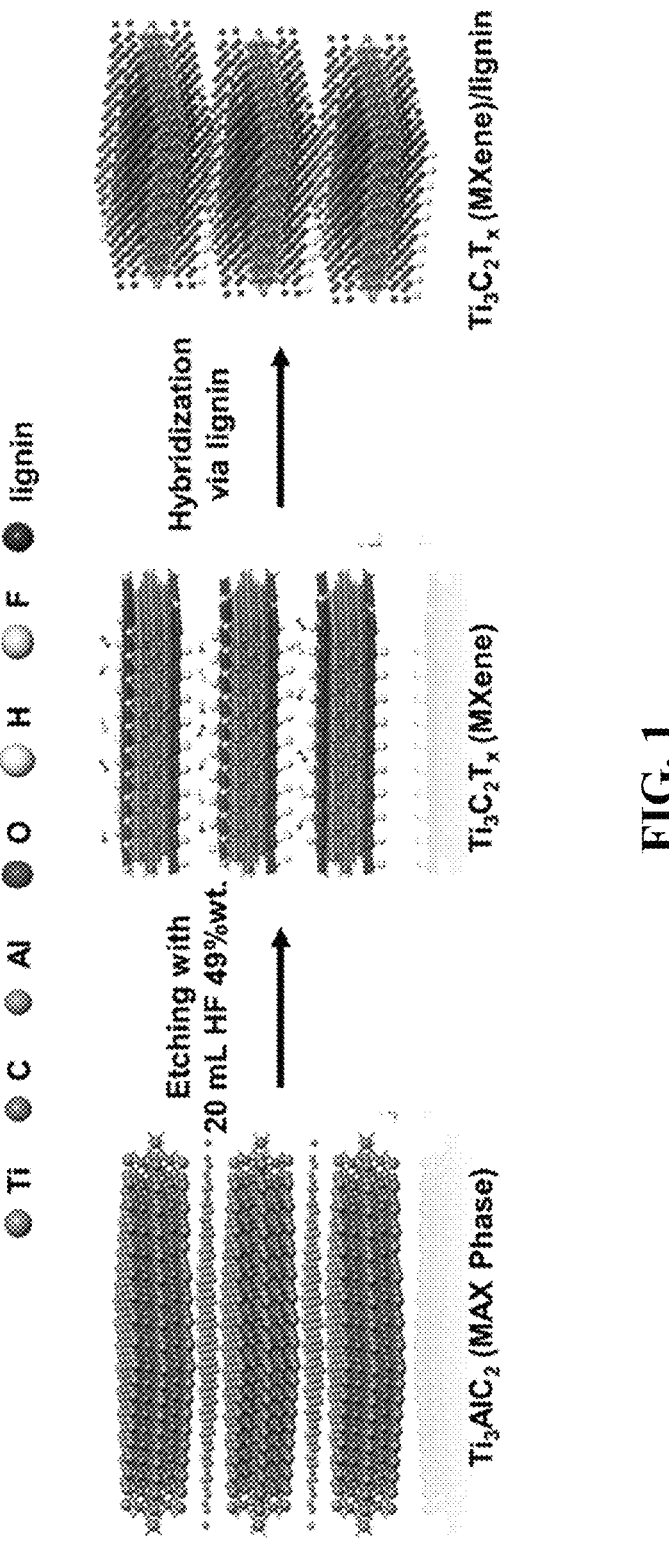
FIG. 1 shows a schematic diagram illustrating the method of manufacturing a MXene-lignin composite according to one embodiment of the present invention.

Hereinafter, preferred embodiments of the present invention will be described in detail with reference to the accompanying drawings. The advantages and features of the present invention and methods for achieving them will become apparent with reference to the embodiments described in detail below together with the accompanying drawings. However, the present invention is not limited to the embodiments disclosed below, but may be implemented in various different forms, and the present embodiments are provided only to make the disclosure of the present invention complete and to fully inform those skilled in the art of the scope of the invention, and the present invention is defined only by the scope of the claims. The same reference numerals refer to the same elements throughout the specification.

Unless otherwise defined, all terms (including technical and scientific terms) used herein may be used as the same meaning as generally understood by one of ordinary skill in the art to which the present invention pertains. In addition, terms defined in commonly used dictionaries are not interpreted in an idealized or overly formal sense unless clearly so defined in the present invention. The terminology used herein is for the purpose of describing embodiments only and is not intended to limit the present invention. Singular forms used herein include plural forms, unless the context clearly indicates otherwise.

"Comprise" and/or "comprising" used herein specify(ies) the presence of mentioned components, steps, operations, and/or devices do(es) not preclude the possibility of the presence or addition of one or more other components, steps, operations, and/or devices.

MXene-Lignin Composite and Manufacturing Method Thereof

FIG. 1 shows a schematic diagram illustrating the method of manufacturing a MXene-lignin composite according to one embodiment of the present invention.

Referring to FIG. 1, a method of manufacturing a MXene-lignin composite according to an embodiment of the present invention may first be performed by etching a MAX phase compound to manufacture multiple layers of MXene nanosheets of $M_{n+1}X_nT_x$ (n=1, 2, or 3) phase, and then hybridizing the MXene nanosheets with lignin to manufacture a MXene-lignin composite. Here, M is a transition metal, and may include, for example, Ti, Zr, Hf, V, Nb, Ta, Cr, Mo, W, or two or more thereof, A may be Al, Ga, In, Tl, Si, Ge, Sn, Pb, P, As, Sb, or a combination thereof, and X may be C, N, or a combination thereof.

Mxene is a two-dimensional (2D) material having conductivity and may be in the form of a sheet formed of a transition metal oxide or a transition metal nitride. These MXene sheets may be in the form of a plurality of MXene flakes or MXene nanosheets, for example, MXene nanosheets.

The MXene nanosheet may be a transition metal carbide or transition metal nitride represented by $M_{n+1}X_nT_x$ (n=1, 2, or 3). Here, M is a transition metal, for example, Ti, Zr, Hf, V, Nb, Ta, Cr, Mo, W, or two or more thereof, X may be C, N, or a combination thereof, and Tx may be F, OH, or O as terminal groups having negative charges in a various plural number.

In particular, the MXene nanosheet may include terminal groups ($T_x$) having negative charges in a various plural number so that a complexation or hybridization reaction with lignin, which will be described later, may be performed easily.

The $M_{n+1}X_nT_x$ (n=1, 2, or 3) may have a structure in which an atomic layer of carbon, nitrogen or a combination thereof (X, specifically a carbon or nitrogen atomic layer) is sandwiched between adjacent transition metal (M) atomic layers among 2 to 4 transition metal (M) atomic layers, thereby covalently bonding to the transition metal. The transition metal atomic layer may include one transition metal or may include two or more different transition metals. Alternatively, the laminated transition metal atomic layers may be the same transition metal atomic layers or different transition metal atomic layers. In addition, the laminated carbon or nitrogen layers (X) may all be carbon layers or nitrogen layers, or some layers may be carbon layers and the remaining other layers may be nitrogen layers.

On the surface of the MXene nanosheet, functional groups ($T_x$) having a negative charge, specifically F, OH, and/or O, for example, F or O, may be positioned.

The $M_{n+1}X_nT_x$ (n=1) may be $Ti_2CT_x$, $V_2CT_x$, $Nb_2CT_x$, $Mo_2CT_x$, $Ti_2NT_x$, $V_2NT_x$, $Mo_2NT_x$, $(Ti_{0.5}Nb_{0.5})_2CT_x$, $(Ti_{0.5}V_{0.5})_2CT_x$, or $(Mo_{2/3}Y_{1/3})_2CT_x$. The $M_{n+1}X_nT_x$ (n=2) may be $Ti_3C_2T_x$, $Ti_3CNT_x$, $Zr_3C_2T_x$, $Hf_3C_2T_x$, $(Ti_{0.5}V_{0.5})_3C_2T_x$, $(Cr_{0.5}V_{0.5})_3C_2T_x$, $(Cr_{2/3}Ti_{1/3})_3C_2T_x$, $(Mo_{2/3}SC_{1/3})_3C_2T_x$, $Mo_2TiC_2T_x$, or $Cr_2TiC_2T_x$. The $M_{n+1}X_nT_x$ (n=3) may be $Ti_4N_3T_x$, $V_4C_3T_x$, $Nb_4C_3T_x$, $Ta_4C_3T_x$, $(Nb_{0.5}Ti_{0.2})_4C_3T_x$, $(Nb_{0.8}Zr_{0.2})_4C_3T_x$, $(Mo_{0.5}Ti_{0.5})_4C_3T_x$, or $Mo_2Ti_2C_3T_x$. For example, a MXene unit layer may be $Ti_3C_2T_x$.

These MXene nanosheets are materials having a MAX phase, that is, a structure in which an A layer, specifically an A atomic layer, is sandwiched between $M_{n+1}X_n$ unit layers, and may be obtained through a process of selectively etching the A layer. The A may be Al, Ga, In, Tl, Si, Ge, Sn, Pb, P, As, Sb, or a combination thereof, and may be Al in one example. At this time, the etching process may mean that the MAX phase of a plurality of layers is exfoliated into individual MXene (MX) unit layers by selectively removing the A atomic layer using, for example, a hydrofluoric acid (HF) solution.

The etching process may be performed at about 40 to 80° C., specifically 50 to 70° C., and may be performed for 6 to 48 hours, specifically 12 to 24 hours, but is not limited thereto.

The concentration of the HF solution may be in the range of 30% to 80% by weight, specifically 40% to 50% by weight, as an aqueous solution, but is not limited thereto.

Thereafter, the manufactured MXene nanosheets may be dried and prepared as powder, and an MXene-lignin composite may be manufactured through a process of mixing it with lignin. In particular, the MXene nanosheets may include a plurality of terminal groups ($T_x$) with negative charges, of various numbers, thereby forming a chemical bond with lignin, which will be described later, so that a complexation or hybridization reaction may be easily performed.

Lignin may be an essential component of the secondary cell walls of plants and some algae. Lignin may generally be derived from plants, such as wood sources. There are several known methods for separating lignin components from plant sources, but lignin may be obtained by applying a method of decomposing and removing other components in plants to leave lignin as an insoluble residue, for example, a method of treating wood pieces with saturated concentrated hydrochloric acid at 0° C. to separate lignin from the remaining portion, and a method of making lignin soluble and dissolving it, for example, a method of separating lignin from a portion dissolved with sodium hydroxide and sodium sulfite, and the like. Among them, lignin may be easily obtained through a commercial chemical pulping process, but the method is not limited thereto.

The lignin may a type of three-dimensional aromatic polymer, specifically, a type of phenol polymer, which may be fat-soluble and amorphous polymer. The lignin largely includes three phenyl propane units including p-coumaryl alcohol, coniferyl alcohol, and sinapyl alcohol, which are connected by a C—O—C bond (β-O-4, α-O-4, 4—O-5), a C—C bond (β-5, 5-5), and the like.

The chemical structure of the lignin may include functional groups such as a hydroxyl group, a carboxyl group, and a C1 to C3 alkoxy group in at least a part of the aromatic ring thereof. In particular, in the complexation step of the MXene-lignin composite described below, at least one of the functional groups, for example, a hydroxyl group may be chemically bonded to MXene, thereby forming a MXene-lignin composite in which a chemical transfer has occurred.

In addition, a lignin derivative formed by substituting some of the functional groups included in the chemical structure of the lignin with other functional groups, for example, a thiol (—SH) functional group, may be included.

Figure 17:
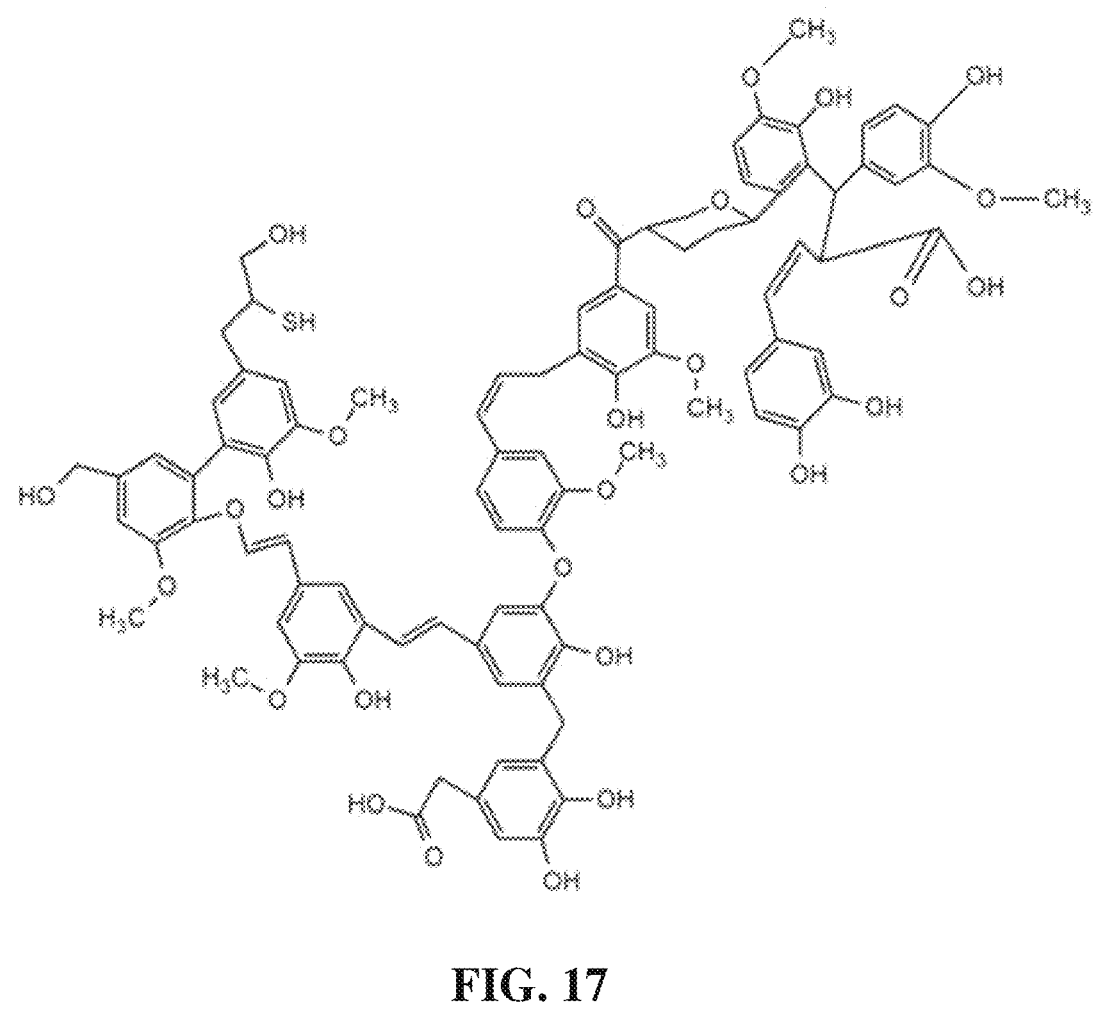

The lignin may be represented by Chemical Formula 1 in FIG. 17.

In addition, the lignin may be a sulfur(S)-containing lignin or lignin derivative that may be obtained by a commercial chemical pulping process, and more specifically, it may be kraft lignin, but is not limited thereto.

The MXene-lignin composite may include the above-described MXene sheet and lignin that forms a chemical bond to the MXene sheet.

Specifically, the chemical bond may include a chemical bond between a transition metal (M) of the MXene sheet and a functional group included in the lignin. More specifically, the chemical bond may include a chemical bond represented by M-OH as a bond between a transition metal (M) of the MXene sheet and a hydroxyl group (—OH) included in the lignin. More specifically, the chemical bond may include a chemical bond represented by Ti—OH as a bond between Ti as a transition metal (M) of the MXene sheet and a hydroxyl group (—OH) included in the lignin.

Figure 2:
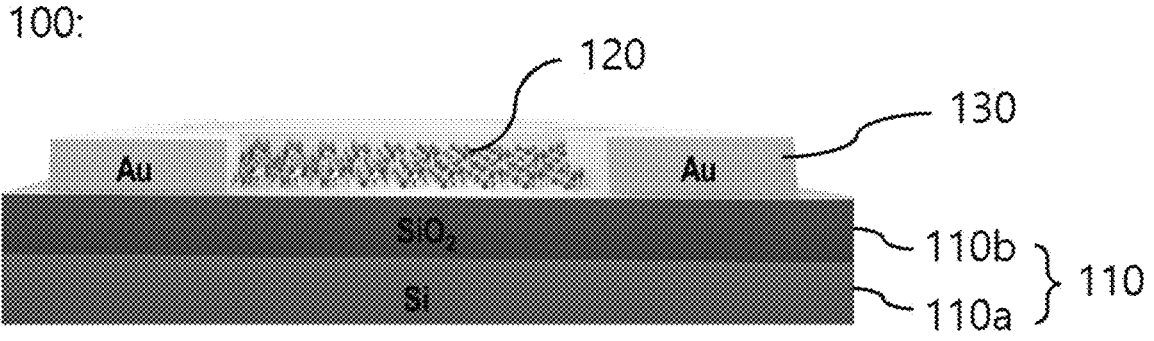
FIG. 2 shows a schematic diagram illustrating the structure of the power-free chemical sensor including a MXene-lignin composite according to one embodiment of the present invention.
Figure 3:
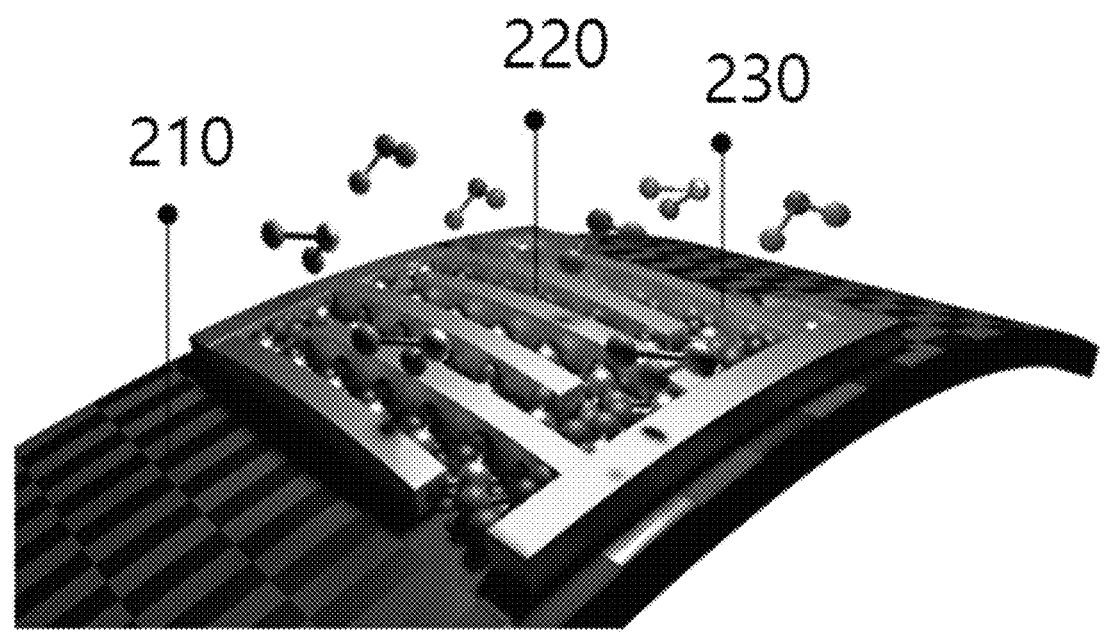
FIG. 3 shows a schematic diagram illustrating the structure of the power-free chemical sensor including a MXene-lignin composite using a flexible substrate according to one embodiment of the present invention.

Power-Free Chemical Sensor Including a MXene-Lignin Composite as an Active Layer and Method of Manufacturing the Same FIG. 2 shows a schematic diagram illustrating the structure of the power-free chemical sensor including a MXene-lignin composite according to one embodiment of the present invention, and FIG. 3 shows a schematic diagram illustrating the structure of the power-free chemical sensor including a MXene-lignin composite using a flexible substrate according to one embodiment of the present invention.

Referring to FIGS. 2 and 3, a power-free chemical sensor 100 and 200 including a MXene-lignin composite of the present invention may include: a substrate 110 and 210; an MXene-lignin composite film 120 and 220 provided on the substrate 110 and 210 and including an MXene sheet represented by $M_{n+1}X_nT_x$ (n=1, 2, or 3) and lignin for a chemical bond to the MXene sheet; and a metal electrode 130 and 230 formed on at least a part of the MXene-lignin composite film 120 and 220.

As the substrate 110 and 210, any substrate used for manufacturing a device for implementing a general chemical sensor may be used without limitation, and for example, any one selected from a semiconductor substrate, a glass substrate, a plastic substrate, and a flexible conductive substrate may be used.

In one embodiment of the present invention (see FIG. 3), when the substrate 110 is a semiconductor substrate, a silicon (Si) 110a substrate may be used, and at this time, an insulating layer 110b may be further formed on the silicon substrate 110a. The insulating layer 110b may be formed of a material having low electrical conductivity, and may be formed of, for example, an oxide such as silicon oxide, hafnium oxide, aluminum oxide, tungsten oxide, titanium oxide, or ruthenium oxide, or an insulating polymer. Specifically, the insulating layer may be silicon oxide ($SiO_2$). In one specific example, as the substrate 110, a Si substrate on which a $SiO_2$ dielectric layer having a thickness of several to several hundred nanometers is formed may be used, but the substrate is not limited thereto.

In another embodiment of the present invention (see FIG. 4), when the substrate 210 is a flexible conductive substrate, a substrate in which an electrically conductive filler is impregnated in a chemically resistant polymer resin having flexibility may be used, and as the polymer resin, an epoxy resin, a polyamide resin, a silicone resin, a polyester resin, and the like may be used, but the polymer resin is not limited thereto. As the conductive filler, a carbon filler such as carbon fiber, a carbon nanotube, a carbon nanofiber, graphene, or graphite; a metal filler such as Au, Ni, Ag, Cu, Al, Pt, W, Pd, Si, Ti, or Rh; a conductive polymer material such as polythiophene, polyacetylene, polyaniline, polypyrrole, poly(p-phenylene), or poly(p-phenylene vinylene); an ionic liquid; and the like may be used, but the filler is not limited thereto, and these may be used alone or in combination of two or more. In one specific example, as the substrate 210, an epoxy composite substrate including carbon fiber may be used, but the substrate is not limited thereto.

The MXene-lignin composite film 120 and 220 may be used as an active layer of a power-free chemical sensor, and specifically, may include a MXene sheet represented by $M_{n+1}X_nT_x$ (n=1, 2, or 3) and lignin forming a chemical bond to the MXene sheet.

The MXene sheet and the lignin may be used in the same manner as described in the above MXene-lignin composite section, and a detailed description thereof will be omitted for concise description.

The metal electrode 130 and 230 may include at least one electrode, for example, two metal electrodes, formed on at least a part of the MXene-lignin composite film 120 and 220. Two metal electrodes 130 and 230 may be formed as a thin film on the surface of the active layer of the sensor, and may include an interdigitated electrode pair structure in which the electrodes are disposed alternately in an interdigital shape, but not in contact with each other, to increase the contact area with the active layer.

As the metal electrode 130 and 230, any conductive material used in manufacturing a device for implementing a chemical sensor may be used without limitation, and for example, at least one selected from Au, Ni, Ag, Cu, Al, Pt, W, Pd, Si, Ti, Rh, and a combination thereof may be used. In the case of two or more metal electrodes 130 and 230, the same type or different types of metallic materials may be used, and the type of the metal electrodes 130 and 230 may vary depending on the type of substrate 110 and 210 used. In one specific example, the metal electrodes 130 and 230 may be Au or Ni, but are not limited thereto.

Figure 4:
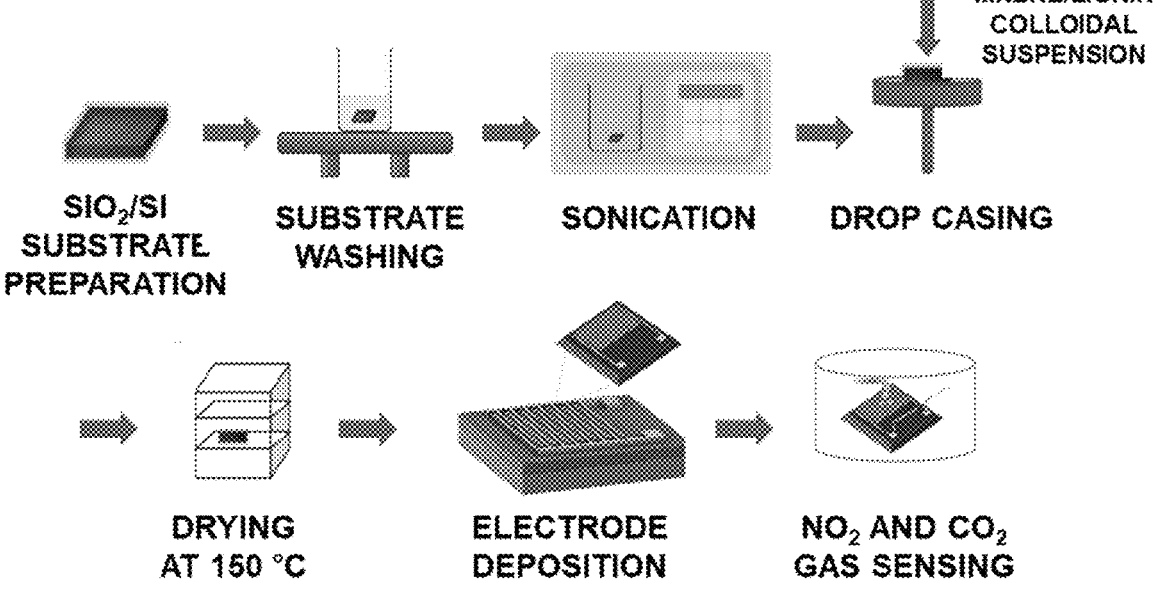
FIG. 4 shows a schematic diagram illustrating the method of manufacturing a power-free chemical sensor including a MXene-lignin composite according to one embodiment of the present invention.

FIG. 4 shows a schematic diagram illustrating the method of manufacturing a power-free chemical sensor including a MXene-lignin composite according to one embodiment of the present invention.

Referring to FIG. 4, a step of preparing and washing a semiconductor substrate may be performed first. The step may include washing the semiconductor substrate sequentially with acetone, isopropyl alcohol, ethanol, and deionized water, and then ultrasonically treating for 10 minutes and drying to clean organic residues and impurities on the substrate.

Thereafter, a step of manufacturing an MXene-lignin composite film by coating the washed semiconductor substrate with an MXene-lignin composite colloidal suspension may be performed. The MXene-lignin composite colloidal suspension may be prepared by mixing the MXene sheet, the lignin, and an organic solvent. The mixing ratio of the MXene sheet and the lignin may be in the range of 1:1 to 5:1 in weight ratio, and when mixed in a ratio within the range, the hybridization of the functional group on the surface of the MXene sheet and the lignin may be uniformly performed without surface defects, thereby improving the sensitivity of the chemical sensor. Specifically, the mixing ratio of the MXene sheet and the lignin may be 1:1 to 4:1 by weight, more specifically 1:1 to 3:1, and in one specific example, may be 2:1 by weight, but is not limited thereto.

As the organic solvent, any organic solvent that allows the MXene sheet and the lignin to be easily dispersed and prevents a chemical side reaction from occurring may be used without limitation, but, for example, any one selected from dimethylsulfoxide, dimethylformamide, gamma butyrolactone, N-methylpyrrolidone, and a mixed solvent thereof may be used. In one specific example, the organic solvent may include dimethylsulfoxide, but is not limited thereto.

The MXene-lignin composite film may have a thickness in the scale of tens to hundreds of micrometers, for example, may have a thickness of 10 μm to 100 μm.

Next, a step of drying in an oven the substrate on which the MXene-lignin composite film is formed may be performed. The drying step may be performed at a temperature of 100 to 200° C., and in one specific example, 1 at a temperature of 50° C.

Thereafter, a step of depositing a metal electrode on the substrate on which the dried MXene-lignin composite film is formed may be performed. As the metal electrode, for example, at least one selected from Au, Ni, Pt, W, Pd, Si, Ti, Rh, and a combination thereof may be used. In one specific example, the metal electrode may be Au or Ni, but is not limited thereto.

In the step of depositing the electrode, a method of depositing a metal thin film in which energy at a level that does not induce defects in the active layer is applied, for example, methods such as an electron beam evaporator, a thermal evaporator, and sputtering may be used without limitation.

Hereinafter, the present invention will be described in more detail using examples and comparative examples. However, the following examples and comparative examples are intended to illustrate the present invention, and the scope of the present invention is not limited thereto.

Manufacturing Example 1: Preparation of Colloidal Solution Containing MXene-Lignin Composite First, 1 g of $Ti_3AlC_2$ (purity ≥90 wt %), a precursor of MAX phase, was used and added to 20 mL of an HF solution (49%, v/v), and the resulting mixture was stirred magnetically at room temperature for 24 hours to etch the Al atomic layer. The precursor powder was added slowly to prevent excessive foaming due to the exothermic nature of the etching reaction. Subsequently, the solution where etching was performed was washed with deionized water and centrifuged at 3,500 rpm for five minutes, and the supernatant was poured out and redispersed. The washing process was repeated several times until the pH of the solution became 6 or higher. The colloidal solution containing the $Ti_3C_2T_x$ MXene sheets obtained through this process was centrifuged at 3,500 rpm for 30 minutes to obtain the supernatant containing the exfoliated MXene colloidal solution. Thereafter, the MXene sheet was oven-dried at 150° C. for 24 hours.

Next, powder obtained by pulverizing the dried MXene sheet was mixed with the and lignin at a weight ratio of 2:1, and 1 mL of dimethylsulfoxide (DMSO; ≥99.9 wt %, v/v) was used as a solvent to prepare a MXene-lignin mixed solution. The mixed solution was sonicated for two hours and magnetically stirred at room temperature for 24 hours to prepare a colloidal suspension containing an MXene-lignin composite in which MXene and lignin were homogeneously complexed.

Manufacturing Example 2: Preparation of Colloidal
Solution Containing MXene Sheets A colloidal solution containing MXene sheets was prepared using the same method as Manufacturing Example 1, except that the step of mixing lignin was not performed.

Example 1: Manufacture of Power-Free Chemical
Sensor Including MXene-Lignin Composite A 300 nm-thick $SiO_2$/Si wafer substrate was cut into 1×1 cm pieces, which were washed sequentially with acetone, isopropyl alcohol, ethanol, and deionized water, sonicated for 10 minutes, and dried to clean organic residues and impurities on the substrate. Next, 20 mg of the colloidal solution containing the MXene-lignin composite of Manufacturing Example 1 was drop cast onto the cut wafer substrate using a 100 μm micropipette, and oven-dried at 150° C. for 30 minutes to remove the solvent and residues, thereby forming a MXene-lignin composite thin film. Thereafter, an electron beam deposition method was used to deposit a 100 nm-thick Au electrode at a vacuum pressure of $1×10^{-6}$ Torr. The Au electrodes were custom interdigitated electrodes.

Comparative Example 1: Manufacture of
Power-Free Chemical Sensor Including MXene
Sheet A power-free chemical sensor including a MXene sheet was manufactured using the same method as in Example 1, except that the colloidal solution including the MXene sheet of Manufacturing Example 2 was used instead of the colloidal solution including the MXene-lignin composite of Manufacturing Example 1.

Example 2: Manufacture of Power-Free Chemical
Sensor Including MXene-Lignin Composite
Implemented on a Flexible Substrate A power-free chemical sensor including a MXene-lignin composite implemented on a flexible substrate was manufactured using the same method as in Example 1, except that an epoxy composite flexible substrate including carbon fibers was used instead of a wafer substrate and that Ni electrodes were used instead of Au electrodes.

≤Experimental Example 1> Material Properties of
MXene-Lignin Composite

Figure 5:
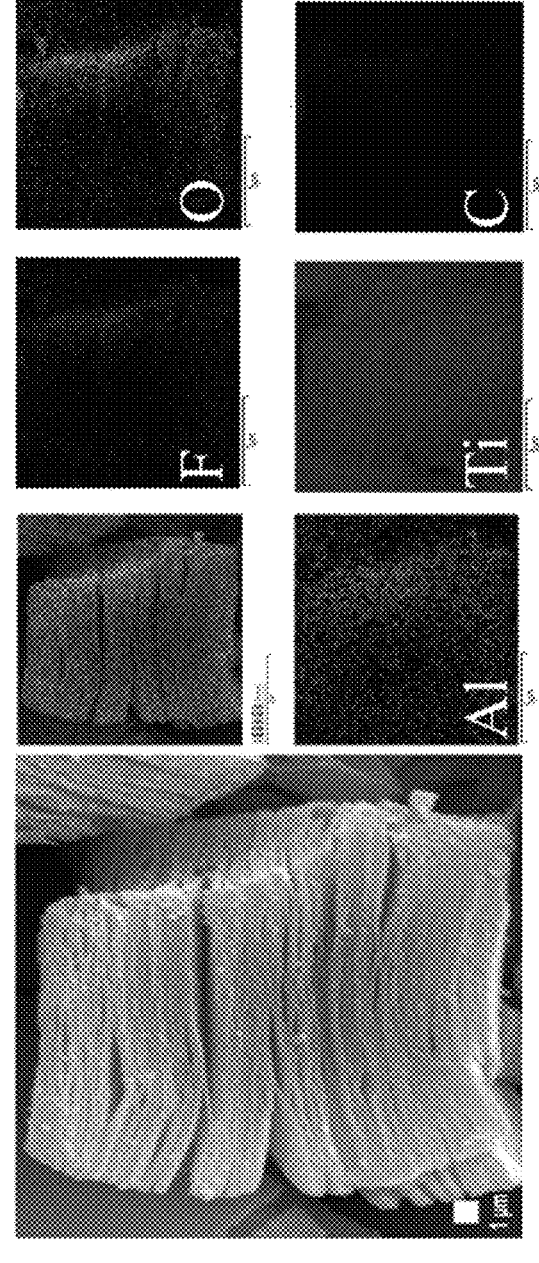
FIG. 5 shows field emission scanning electron microscopy (FE-SEM) images and energy dispersive X-ray spectroscopy (EDS) results of the MXene sheet according to Manufacturing Example 2 of the present invention.
Figure 6:
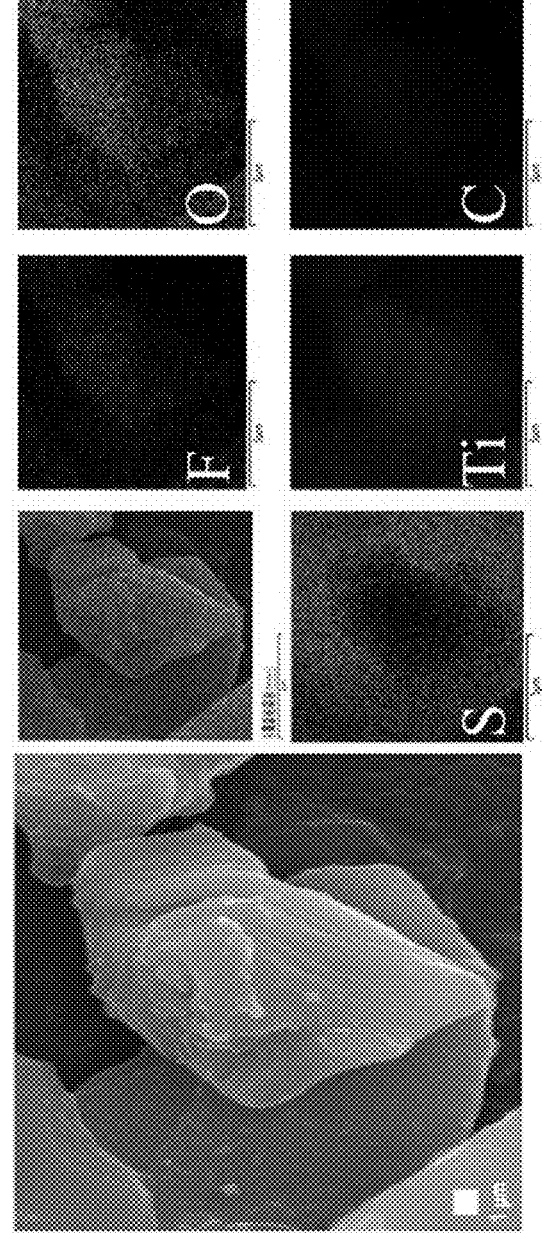
FIG. 6 shows FE-SEM images and EDS results of the MXene-lignin composite according to Manufacturing Example 1 of the present invention.

FIG. 5 shows field emission scanning electron microscopy (FE-SEM) images and energy dispersive X-ray spectroscopy (EDS) results of the MXene sheet according to Manufacturing Example 2 of the present invention, and FIG. 6 shows FE-SEM images and EDS results of the MXene-lignin composite according to Manufacturing Example 1 of the present invention.

Referring to FIGS. 5 and 6, the microstructure of the $Ti_3C_2T_x$ MXene sheet after etching the MAX precursor showed a layered structure in which several to several tens of MXene sheets were loosely laminated, but unlike the microstructure of the layered MXene sheet before complexation, it was confirmed in the MXene-lignin composite that the layered sheet form was not separated but had a lumpy shape. In addition, through the detection of the sulfur(S) element derived from the chemical structure of lignin that, it was be confirmed that hybridization of lignin was performed on the surface of the composite.

Figure 7:
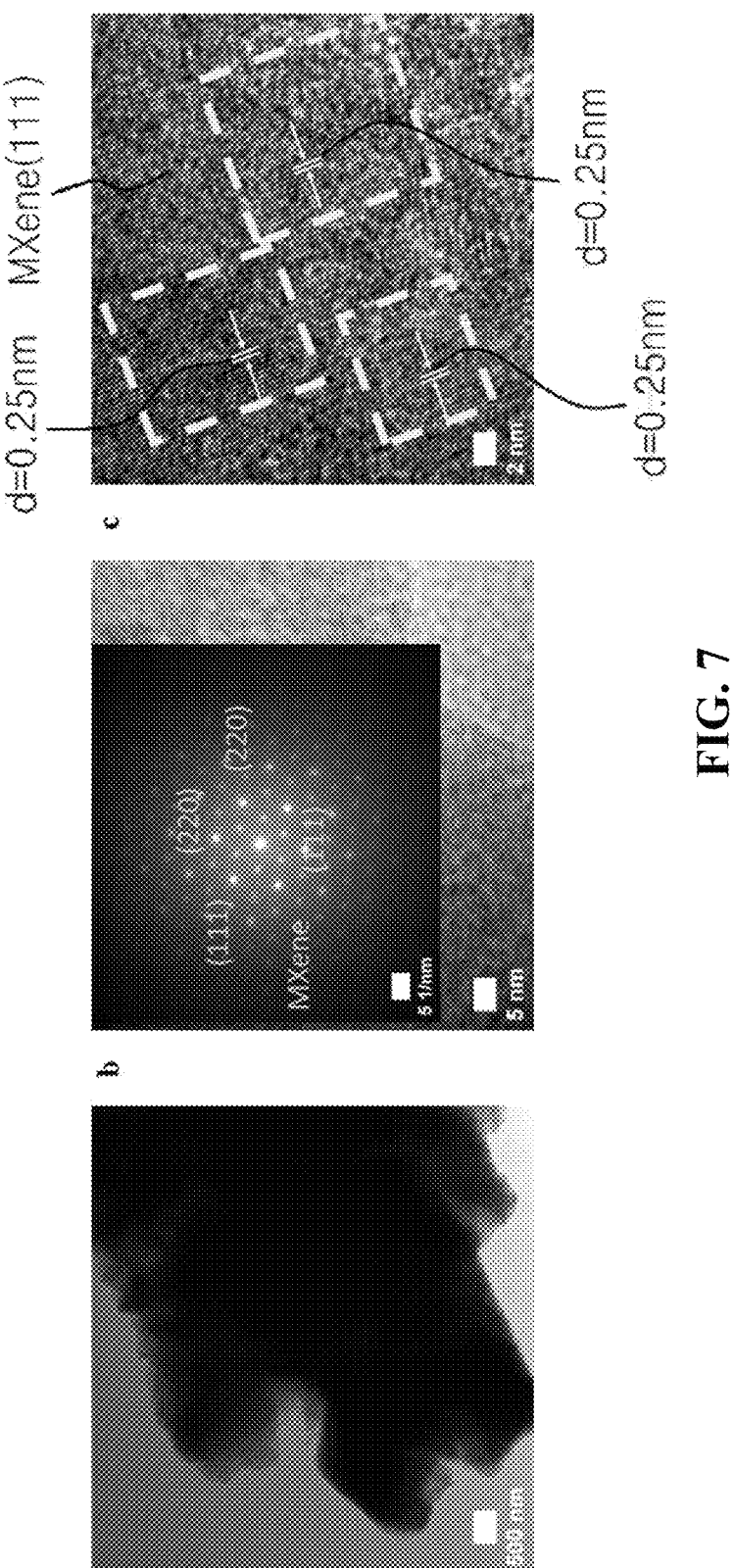
FIG. 7 shows a. field emission transmission electron microscope (FE-TEM), b. selected area electron diffraction (SAED), and c. high resolution transmission electron microscope (HR-TEM) results of the MXene sheet according to Manufacturing Example 2 of the present invention.
Figure 8:
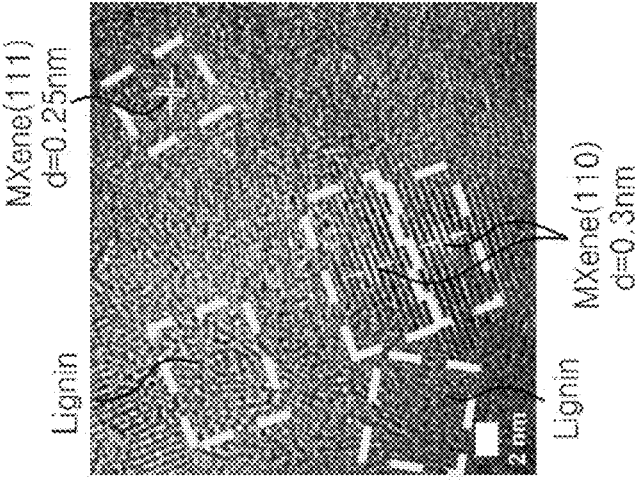
FIG. 8 shows a. FE-TEM, b. SAED, and c. HR-TEM results of the MXene-lignin composite according to Manufacturing Example 1 of the present invention.
Figure 8:
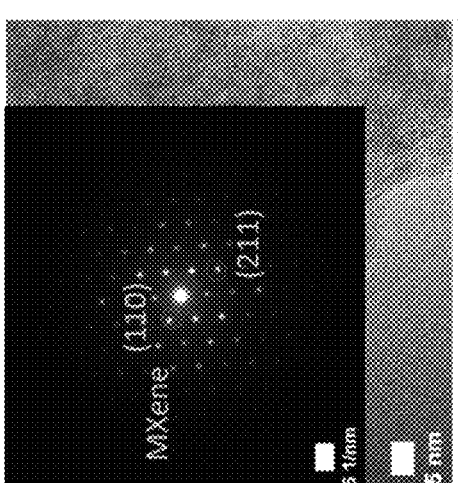
Figure 8:
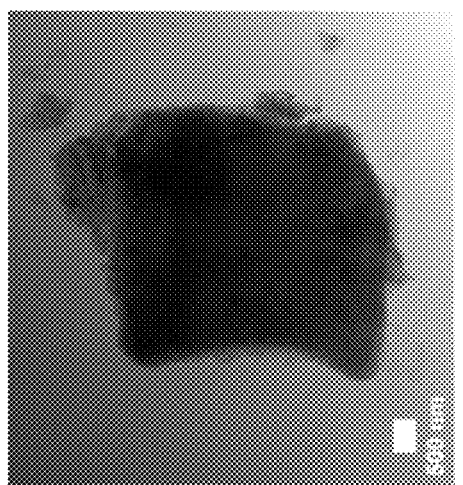

FIG. 7 shows a. field emission transmission electron microscope (FE-TEM), b. selected area electron diffraction (SAED), and c. high resolution transmission electron microscope (HR-TEM) results of the MXene sheet according to Manufacturing Example 2 of the present invention, and FIG. 8 shows a. FE-TEM, b. SAED, and c. HR-TEM results of the MXene-lignin composite according to Manufacturing Example 1 of the present invention.

Referring to FIGS. 7 and 8, it was confirmed that the $Ti_3C_2T_x$ MXene sheet exhibited a typical lattice structure, and the lattice spacing of the MXene corresponding to the $Ti_3C_2T_x$ (111) plane was 0.25 nm (indicated by the solid box in FIG. 7(C)). Meanwhile, it was confirmed that the MXene-lignin composite included some amorphous regions by lignin components (indicated by the dotted box in FIG. 8(C)) and some other crystalline regions by MXene, and the lattice spacing of 0.25 nm corresponding to the $Ti_3C_2T_x$ (111) plane and 0.3 nm corresponding to the $Ti_3C_2T_x$ (110) plane were measured (indicated by the solid box in FIG. 8(C)). In addition, it can be confirmed that each of these lattice spacings matches the SEAD pattern of the MXene-lignin composite measured in FIG. 8B.

Figure 9:
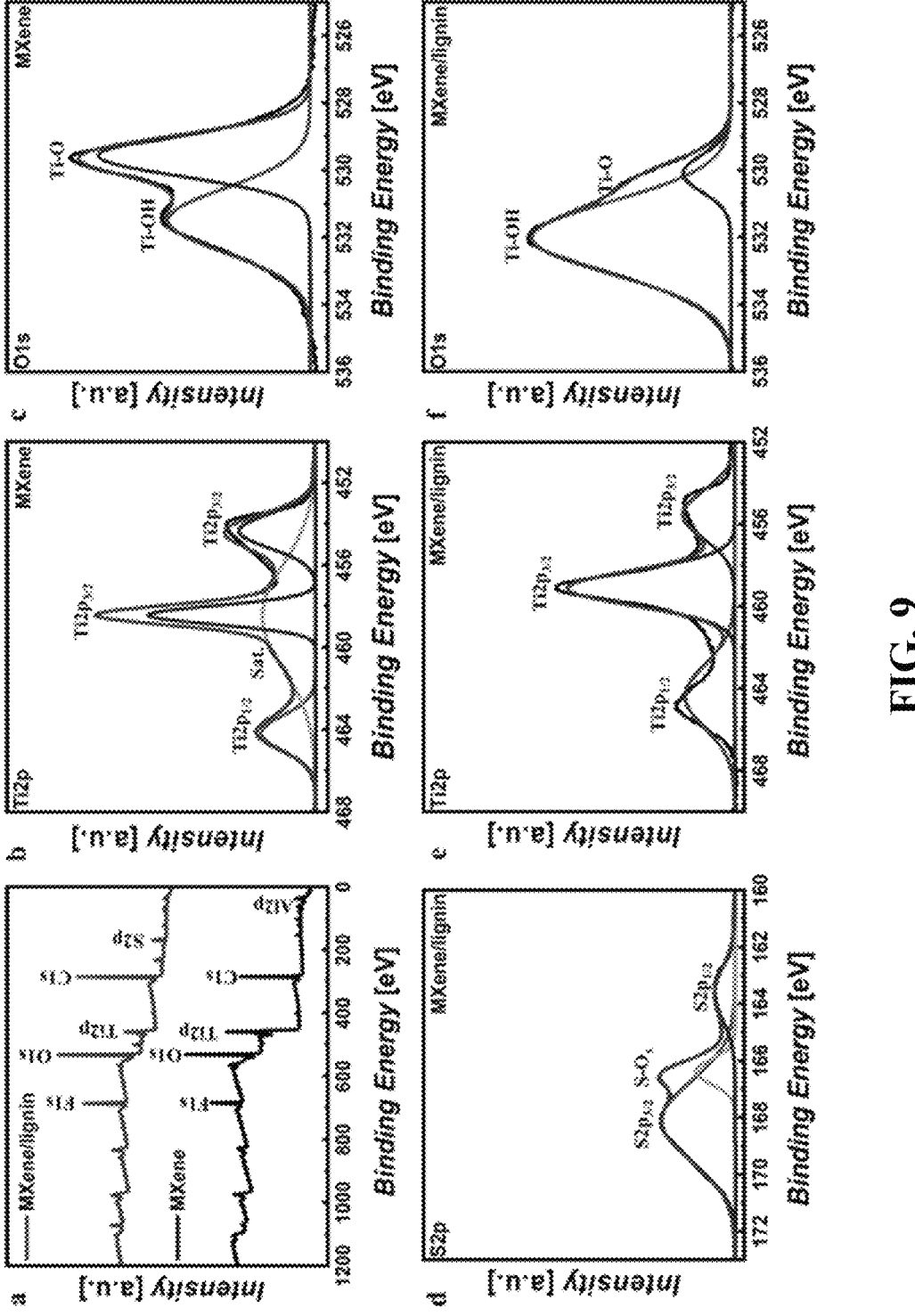
FIG. 9 shows XPS results of the MXene-lignin composite and MXene according to Manufacturing Example 1 and Manufacturing Example 2 of the present invention: a. full survey spectrum; b. Ti 2p peak of the MXene sheet; c. O Is peak of the MXene sheet; d. S 2p peak of the MXene-lignin composite; e. Ti 2p peak of the MXene-lignin composite; and f. O 1s peak of the MXene-lignin composite.

FIG. 9 shows XPS results of the MXene-lignin composite and MXene according to Manufacturing Example 1 and Manufacturing Example 2 of the present invention: a. full survey spectrum; b. Ti 2p peak of the MXene sheet; c. O 1s peak of the MXene sheet; d. S 2p peak of the MXene-lignin composite; e. Ti 2p peak of the MXene-lignin composite; and f. O 1s peak of the MXene-lignin composite.

Referring to FIG. 9, the Ti 2p spectrum of the MXene-lignin composite (FIG. 9E) included peaks at 464.2 eV (Ti $2p_{1/2}$), 459.0 eV (Ti $2p_{3/2}$), and 455.6 eV (Ti $2p_{3/2}$), which were measured similarly when compared to the peaks of pure MXene. Considering these results, the Ti 2p binding energy was similar to that of pure MXene, which may suggest that no chemical bonding was formed between the MXene and the lignin. Meanwhile, the O 1s spectrum for the MXene-lignin composite (FIG. 9F) showed a significant difference in peak intensity compared to the spectrum of pure MXene, which may suggest that the lignin and the MXene underwent a chemical transition during the complexation process. Specifically, considering that the MXene-lignin composite included a strong peak at 531.9 eV due to the Ti—OH group and a weak peak at 529.98 eV due to Ti—O, it was confirmed that the hydroxyl group (—OH) in the lignin induced the formation of a Ti—OH chemical bond during the complexation process.

<Experimental Example 2> Measurement of
Electrical Characteristics of Power-Free Chemical
Sensor Including MXene-Lignin Composite To measure the electrical characteristics of the power-free chemical sensor of the present invention; I-V measurement was performed in a vacuum using a Keithley-4200 semiconductor parameter analyzer (Keithley Instruments, Cleveland, OH, USA). The output characteristics of the power-free chemical sensors based on the MXene sheet and the MXene-lignin composite were obtained by measuring the source-drain current ($I_{ds}$) while varying the voltage drain from −10 V to +10 V.

≤Experimental Example 3> Measurement of Gas
Detection Performance of Power-Free Chemical
Sensor Including MXene-Lignin Composite To measure the gas detection performance of the power-free chemical sensor of the present invention, various concentrations of target gas, for example, $CO_2$ or $NO_2$, may be introduced into the sensor at room temperature in a vacuum. The sensor may be prepared in a sealed Teflon chamber provided with a gas inlet and an outlet.

The results of the reaction of the target gas may be derived by Equation 1 below.

$$R = (|I_g - I_a| / I_a) \times 100\% \qquad \text{[Equation 1]}$$

Here, $I_a$ and $I_g$ may be the sensor currents of the air and the target gas, respectively, under zero voltage bias (i.e., drain current $(V_d)$=0 V).

The power-free chemical sensor according to one example of the present invention may first be prepared in a chamber into which $N_2$ gas is introduced before injecting a target gas for analysis, for example, $CO_2$ or $NO_2$, and the measured value may be used as a reference to perform data normalization.

When a target gas for detection, for example, $CO_2$ or $NO_2$, is injected into the chamber for several seconds, for example, two seconds, the gas detection performance of the sensor may be derived by measuring the current in real time. Thereafter, a process of purging with $N_2$ gas for at least 20 seconds may be further performed to remove previously adsorbed molecules of the target gas before re-injecting the target gas for analysis. The target gas for detection may be controlled using a mass flow controller (MFC), and the measured gas measurement sensitivity may be calculated according to the International Union of Pure and Applied Chemistry (IUPAC) definition.

Figure 10:
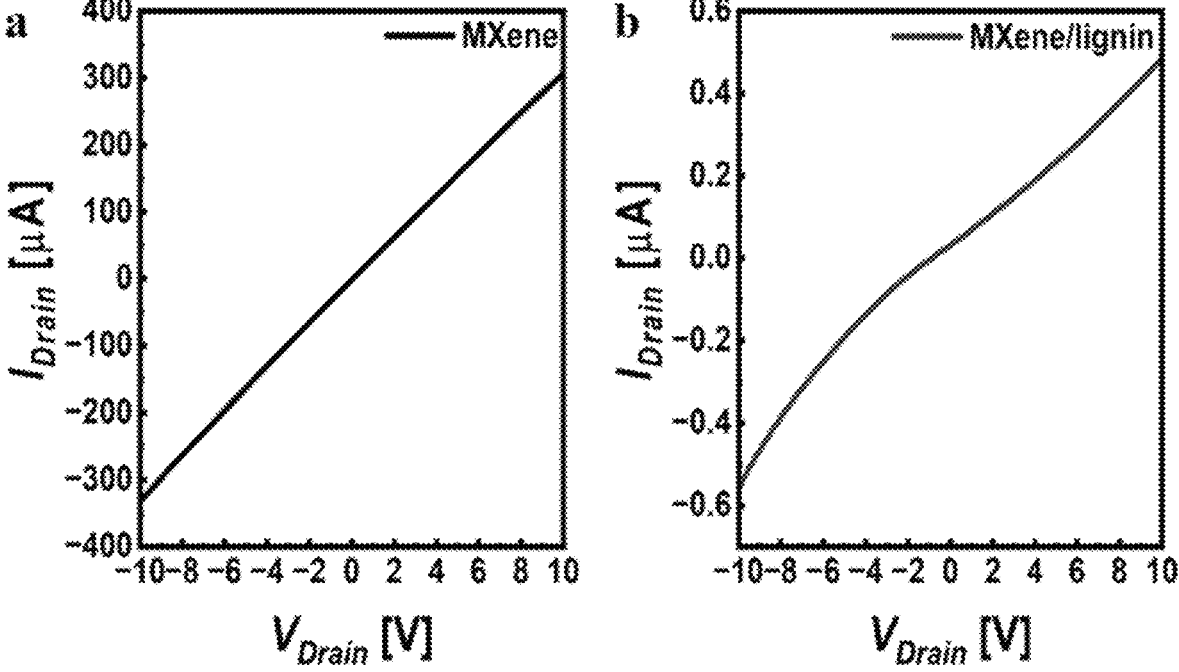
FIG. 10 shows current-voltage (I-V) graphs of the power-free chemical sensor including the MXene-lignin composite and MXene according to Example 1 and Comparative Example 1 of the present invention.

FIG. 10 shows current-voltage (I-V) graphs of the power-free chemical sensor including the MXene-lignin composite and MXene according to Example 1 and Comparative Example 1 of the present invention.

Referring to FIGS. 10A and 10B, it can be confirmed that the power-free chemical sensor using an MXene-lignin composite as an active layer had a lower conductivity of the active layer than when only MXene was included as the active layer, and the ohmic contact characteristics changed into Schottky contact characteristics.

Figure 11:
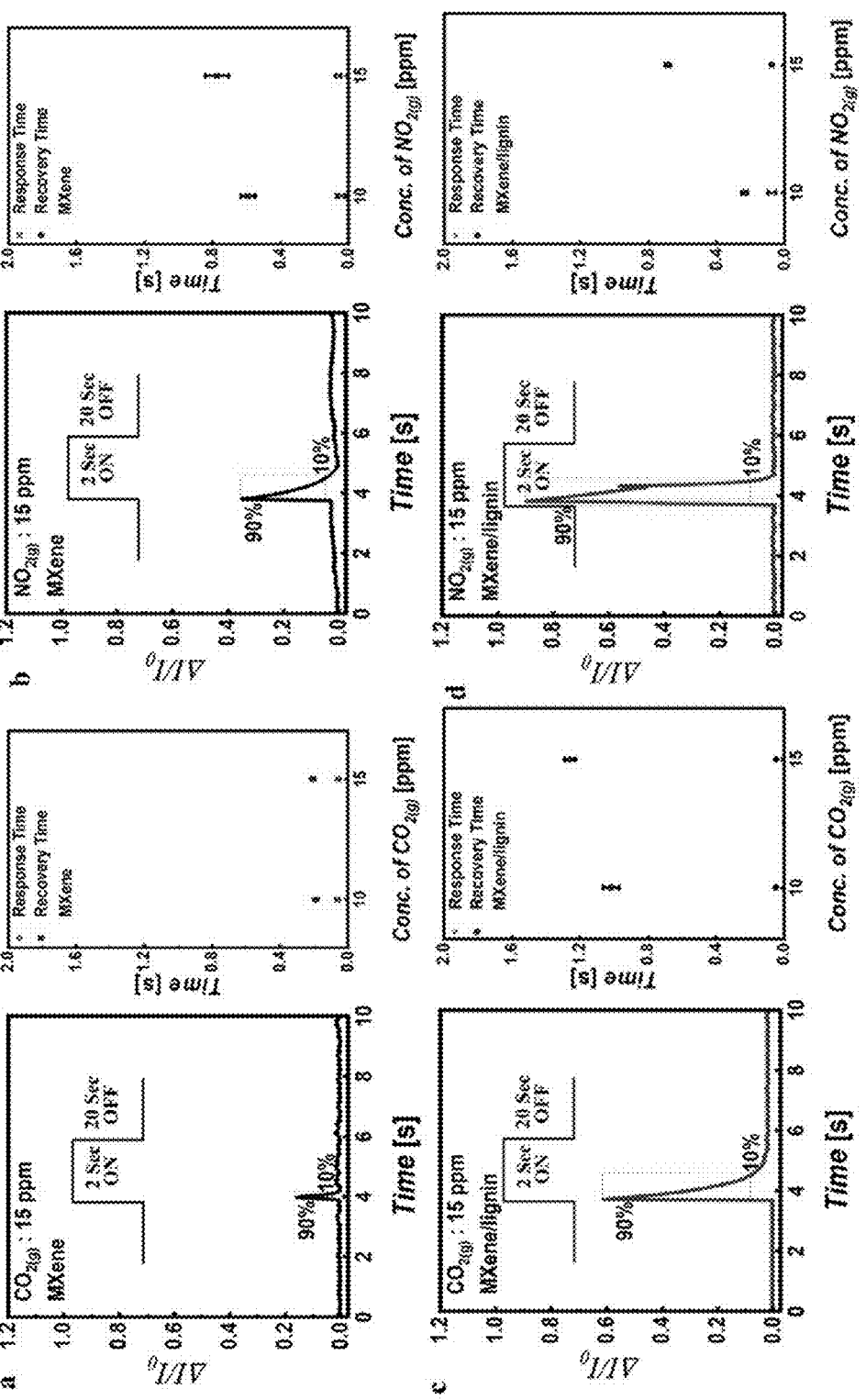
FIG. 11 shows graphs illustrating the current response ($\Delta I/I_0$), response time, and recovery time when exposing a detection target gas to the power-free chemical sensors including the MXene-lignin composite and MXene according to Example 1 and Comparative Example 1 of the present invention.

FIG. 11 shows graphs illustrating the current response $(\Delta I/I_0)$, response time, and recovery time when exposing a detection target gas to the power-free chemical sensors including the MXene-lignin composite and MXene according to Example 1 and Comparative Example 1 of the present invention.

The response time $(\tau_{response}$, denoted as Response Time) was calculated as the time taken to reach 90% of the response value, and the recovery time $(\tau_{recovery}$, denoted as Recovery Time) was calculated as the time taken for the signal to return to within 10%.

Referring to FIG. 11, it can be confirmed that the chemical sensor including the MXene-lignin composite as the active layer (FIGS. 11C and 11D) exhibited higher response compared to the sensor including pure MXene (FIGS. 11A and 11B) when exposed to each of $NO_2$ and $CO_2$ as the target gases at a gas concentration of 15 ppm. In addition, it can be confirmed that when $NO_2$ was used as the target gas, the chemical sensor including the MXene-lignin composite as the active layer (FIG. 11D) was capable of detecting a current change in the nanoampere (nA) level, and it exhibited a faster response rate and recovery rate than those of the sensor including pure MXene (FIG. 11B).

Figure 12:
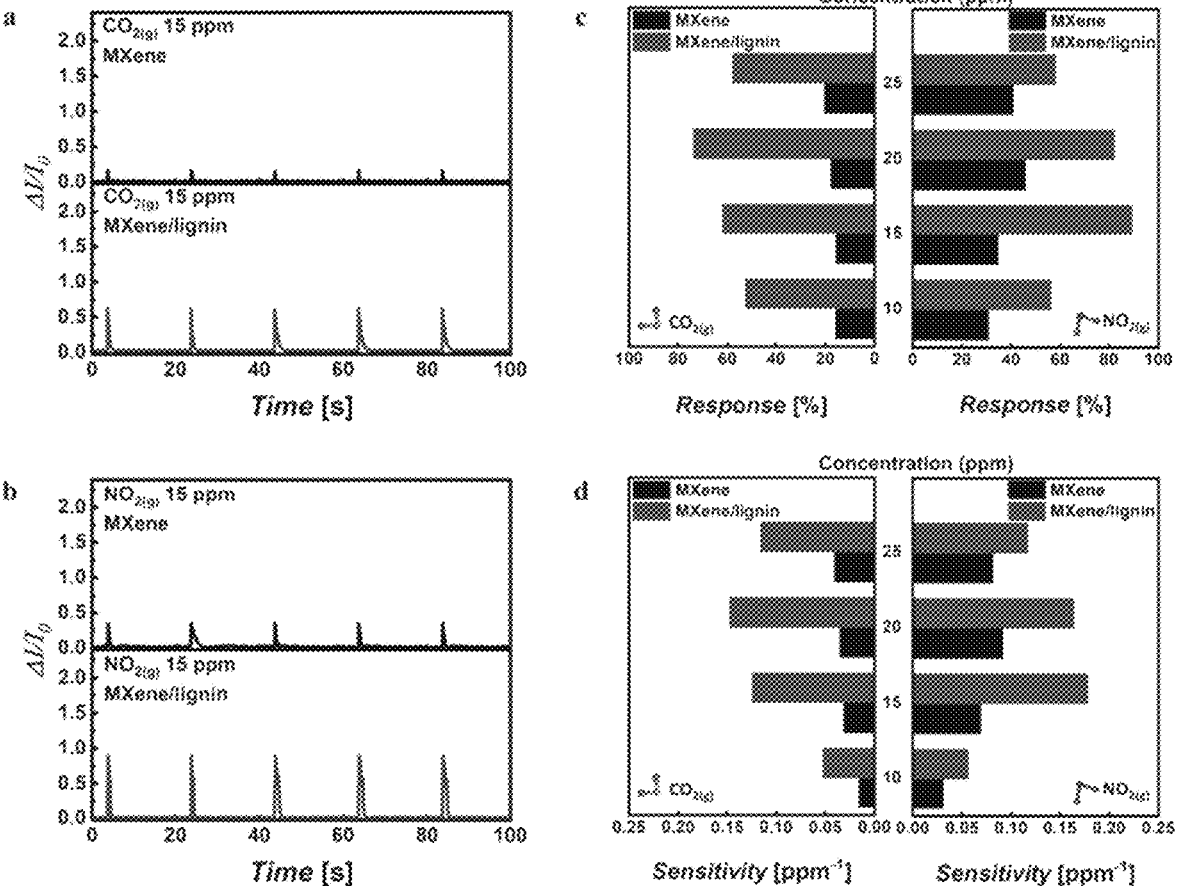
FIG. 12 shows graph illustrating a and b. the current response ($\Delta I/I_0$), c. response (%), and d. sensitivity (ppm$^{-1}$) when exposing a detection target gas in the form of pulses to the power-free chemical sensor including the MXene-lignin composite and MXene according to Example 1 and Comparative Example 1 of the present invention.

FIG. 12 shows graph illustrating a and b. the current response $(\Delta I/I_0)$, c. response (%), and d. sensitivity (ppm$^{-1}$)

when exposing a detection target gas in the form of pulses to the power-free chemical sensor including the MXene-lignin composite and MXene according to Example 1 and Comparative Example 1 of the present invention.

To confirm the change in the measured signal per unit analyte concentration, the sensitivity(S) of the chemical sensor can be calculated using Equation 2 below.

$$S(ppm^{-1}) = \Delta R / \Delta C \qquad \text{[Equation 2]}$$

Here, $\Delta R$ is the sensor response and $\Delta C$ is the change in concentration of the target gas.

Referring to FIG. 12, it can be confirmed that the chemical sensor including the MXene-lignin composite according to the present invention as an active layer may exhibit high chemical sensitivity for both $CO_2$ and $NO_2$ as target gases at a concentration of 15 ppm, while exhibiting repetitive and continuous pulse responses, and that the sensor can be easily recovered and returned to its initial state due to rapid desorption of the target molecules. In particular, it can be confirmed that when the concentration was 15 ppm, the response (%) was improved from 15.64% in Comparative Example 1 using pure MXene for $CO_2$ gas to 62.22% in Example 1 using the MXene-lignin composite, and also for $NO_2$ gas, the response was significantly improved from 34.70% in Comparative Example 1 using pure MXene to 89.32% in Example 1 using the MXene-lignin composite. In addition, it can be confirmed that when the concentration was 15 ppm, the sensitivity (ppm$^{-1}$) of the chemical sensor significantly increased to 157.38% and 297.95% for $CO_2$ and $NO_2$ gases, respectively.

Figure 13:
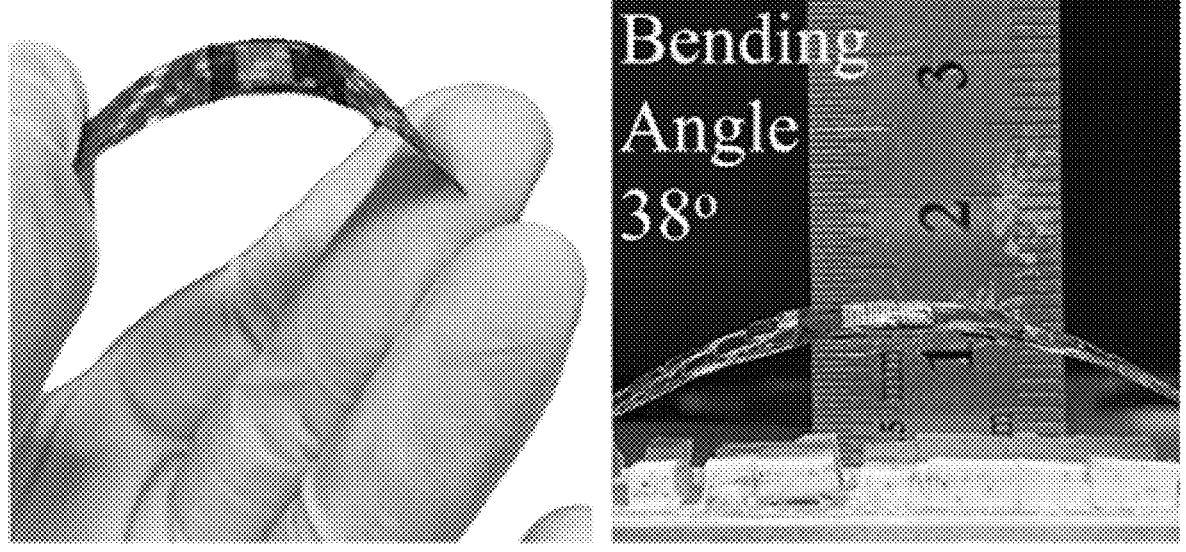
FIG. 13 shows an optical photograph and a bending test result of the power-free chemical sensor including the MXene-lignin composite implemented on a flexible substrate according to Example 2 of the present invention.
Figure 14:
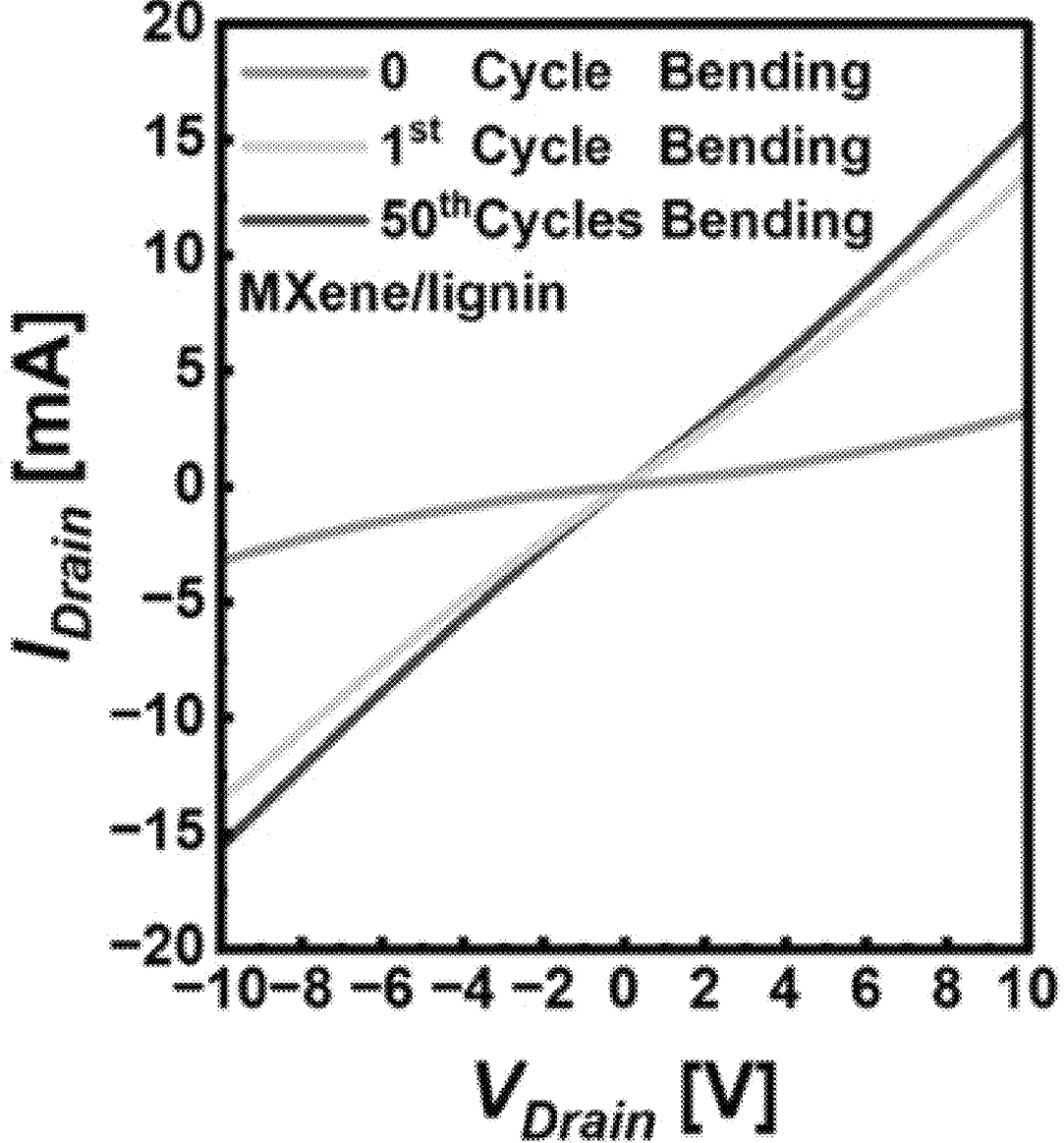
FIG. 14 shows a current-voltage (I-V) graph according to the number of times of bending of the power-free chemical sensor including the MXene-lignin composite implemented on a flexible substrate according to Example 2 of the present invention.
Figure 15:
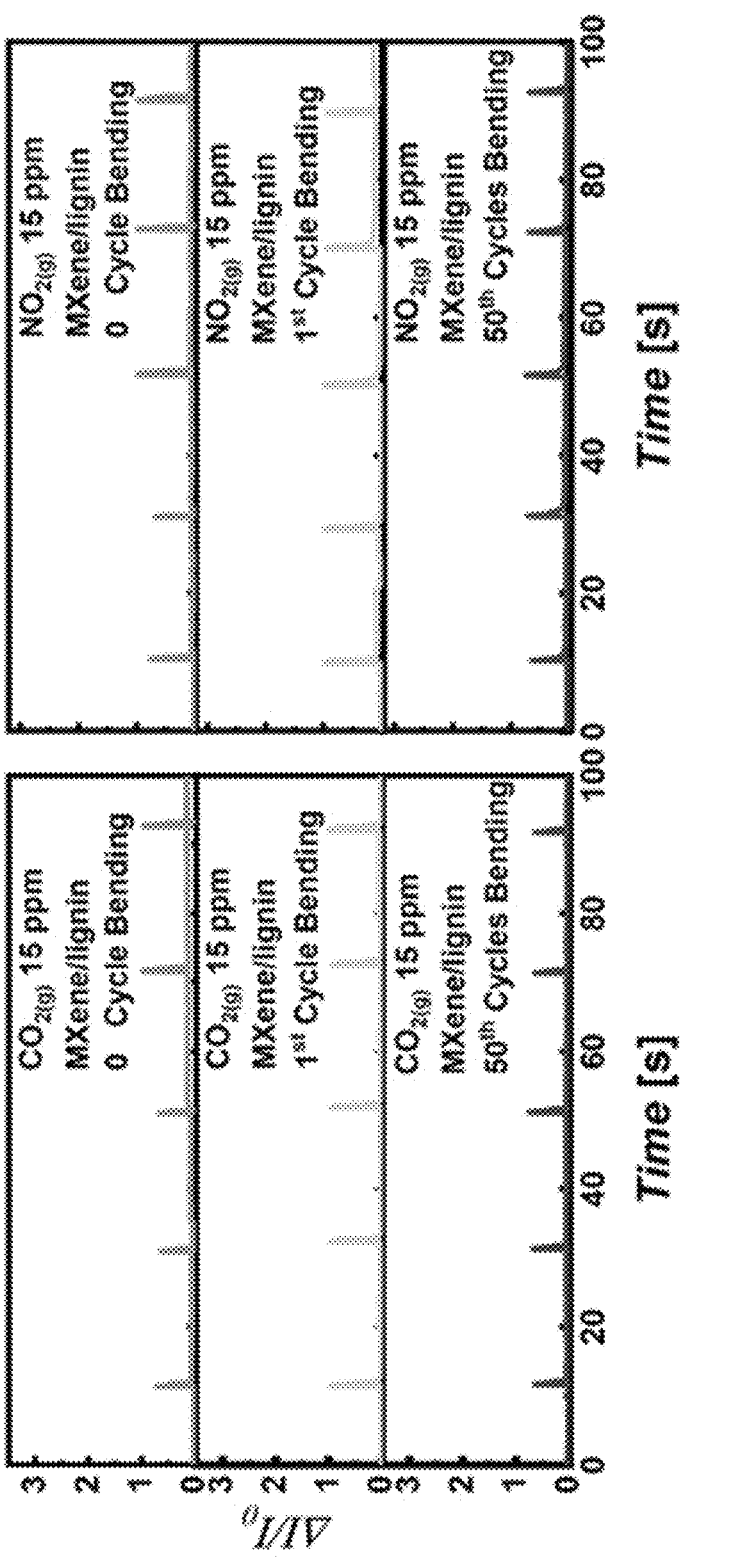
FIG. 15 and FIG. 16 show the results of current response ($\Delta I/I_0$), response (%), and sensitivity (ppm$^{-1}$) according to the number of times of bending when exposing a detection target gas in the form of pulses to the power-free chemical sensor including an MXene-lignin composite implemented on a flexible substrate according to Example 2 of the present invention.
Figure 16:
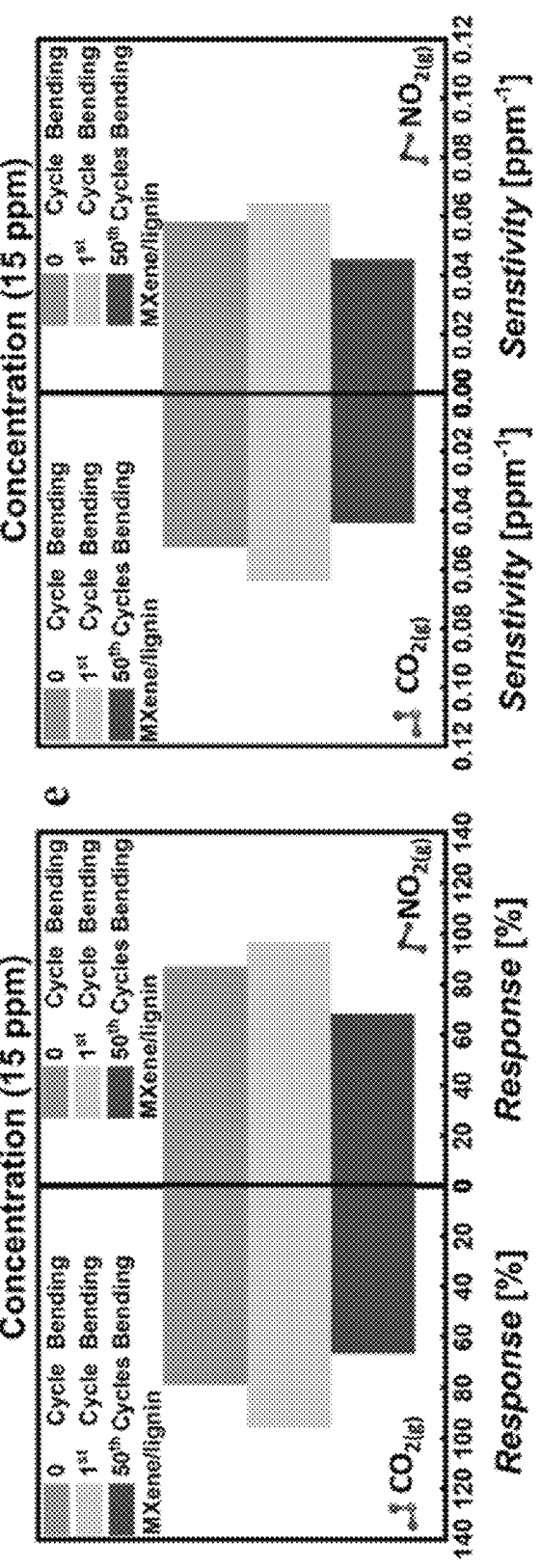

FIG. 13 shows an optical photograph and a bending test result of the power-free chemical sensor including the MXene-lignin composite implemented on a flexible substrate according to Example 2 of the present invention, FIG. 14 shows a current-voltage (I-V) graph according to the number of times of bending of the power-free chemical sensor including the MXene-lignin composite implemented on a flexible substrate according to Example 2 of the present invention, and FIG. 15 and FIG. 16 show the results of current response $(\Delta I/I_0)$, response (%), and sensitivity (ppm$^{-1}$) according to the number of times of bending when exposing a detection target gas in the form of pulses to the power-free chemical sensor including an MXene-lignin composite implemented on a flexible substrate according to Example 2 of the present invention.

Referring to FIGS. 13 to 16, the power-free chemical sensor including the MXene-lignin composite implemented on the flexible substrate secured flexibility, as the measured bending angle was 38°, and exhibited Schottky barrier characteristics similar to those of the inflexible sensor formed on the silicon substrate. The conditions of performing the gas exposure test and exposing the target gas in the form of pulse were performed in the same manner as the above-described conditions for the sensor on the inflexible substrate. In addition, it can be confirmed that even when the bending test was performed up to 50 times, the sensor exhibited high chemical sensitivity for both $CO_2$ and $NO_2$ as the detection target gases at a concentration of 15 ppm, while exhibiting repetitive and continuous pulse responses. Specifically, it can be confirmed that the power-free chemical sensor including the MXene-lignin composite implemented on the flexible substrate still exhibited good response and sensitivity, as the response (%) and sensitivity (ppm$^{-1}$) for $CO_2$ and $NO_2$ gases at a concentration of 15 ppm decreased by only about 10% and 15%, respectively, at the 50th bending cycle.

According to the present invention as described above, a MXene-lignin composite and a power-free chemical sensor including the same as an active layer according to a preferred embodiment of the present invention include a MXene sheet represented by $M_{n+1}X_nT_x$ (n=1, 2, or 3) and lignin forming a chemical bond to the MXene sheet as an active layer, thereby enabling the detection of a current change amount at the nanoampere (nA) level without a power supply and easily implementing a chemical sensor with high chemical sensitivity exhibiting a fast response rate and recovery rate.

The effects of the present invention are not limited to the above-mentioned effects, and other effects that are not mentioned will be clearly understood by those skilled in the art from the description below.

Although the examples of the present invention have been described with reference to the attached drawings, those skilled in the art will understand that the present invention can be implemented in other specific forms without changing the technical idea or essential features thereof. Therefore, it should be understood that the above-described examples are exemplary in all respects and not restrictive.

REFERENCE NUMERALS

100, 200: Power-free chemical sensor
110, 210: Substrate
120, 220: MXene-lignin composite film
130, 230: Metal electrode
What is claimed is:

1. A MXene-lignin composite comprising:
a MXene sheet represented by $M_{n+1}X_nT_x$ (n=1, 2, or 3); and
lignin forming a chemical bond to the MXene sheet,
wherein M is Ti, Zr, Hf, V, Nb, Ta, Cr, Mo, W, or two or more transition metals thereof, X is C, N, or a combination thereof, $T_x$ is F, OH, or O, and
the MXene-lignin composite includes a crystalline region at the MXene sheet and an amorphous region at the lignin, due to hybridization through a chemical bond (M—OH) between the transition metal (M) of the MXene sheet and the hydroxyl group (—OH) functional group included in the lignin.

2. The MXene-lignin composite according to claim 1, wherein the chemical bond includes a chemical bond represented as Ti—OH as a bond between Ti as a transition metal (M) of the MXene sheet and a hydroxyl group (—OH) included in the lignin.

3. A power-free chemical sensor including a MXene-lignin composite, the power-free chemical sensor comprising:
a substrate;
a MXene-lignin composite film provided on the substrate and including an MXene sheet represented by represented by $M_{n+1}X_nT_x$ (n=1, 2, or 3) and lignin forming a chemical bond to the MXene sheet; and
at least one metal electrode formed on at least a part of the MXene-lignin composite film,
where M is Ti, Zr, Hf, V, Nb, Ta, Cr, Mo, W, or two or more transition metals thereof, X is C, N, or a combination thereof, $T_x$ is F, OH, or O, and
the MXene-lignin composite film includes a crystalline region by the MXene sheet and an amorphous region by the lignin, due to hybridization through a chemical bond (M—OH) between the transition metal (M) of the MXene sheet and the hydroxyl group (—OH) functional group included in the lignin.

4. The power-free chemical sensor including a MXene-lignin composite according to claim 3, wherein the chemical bond includes a chemical bond represented as Ti—OH as a bond between Ti as a transition metal (M) of the MXene sheet and a hydroxyl group (—OH) included in the lignin.

5. The power-free chemical sensor including a MXene-lignin composite according to claim 3, wherein the substrate is any one selected from a semiconductor substrate, a glass substrate, a plastic substrate, and a flexible conductive substrate.

6. The power-free chemical sensor including a MXene-lignin composite according to claim 5, wherein the flexible conductive substrate includes an epoxy composite including carbon fibers.

* * * * *